G. L. TANZER.
MOTOR DRIVEN CABLE SUPPORTED CARRIER.
APPLICATION FILED MAR. 12, 1918.

1,276,443.

Patented Aug. 20, 1918.
2 SHEETS—SHEET 1.

Inventor
GOTTWERTH L. TANZER
By his Attorney
Frank Warren

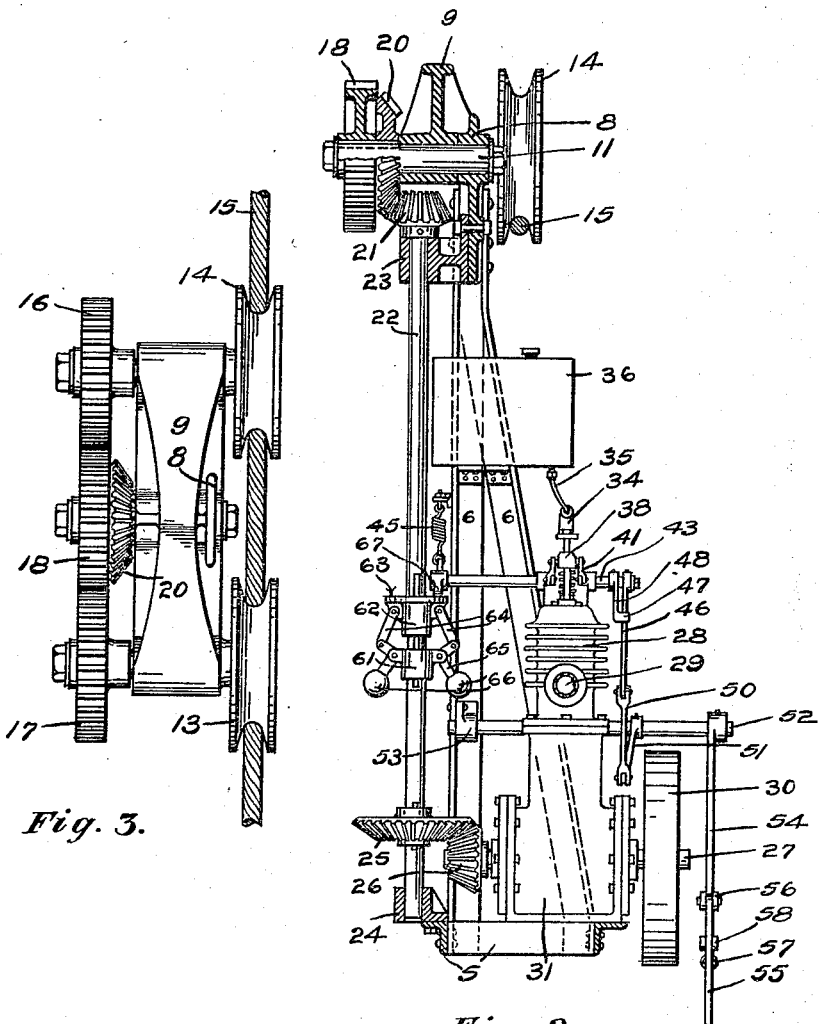

UNITED STATES PATENT OFFICE.

GOTTWERTH L. TANZER, OF SEATTLE, WASHINGTON.

MOTOR-DRIVEN CABLE-SUPPORTED CARRIER.

1,276,443.

Specification of Letters Patent. Patented Aug. 20, 1918.

Application filed March 12, 1918. Serial No. 222,034.

*To all whom it may concern:*

Be it known that I, GOTTWERTH L. TANZER, citizen of the United States, residing at Seattle, in the county of King and State of Washington, have invented a certain new and useful Improvement in Motor-Driven Cable-Supported Carriers, of which the following is a specification.

My invention relates to improvements in motor driven, cable supported tram or carrier that is provided with a truck that is adapted to run on an overhead track cable and the object of my invention is to provide a tram or carrier of this class that has a frame hanging below the truck and an engine or motor mounted on the frame and connected with the truck by suitable power transmission devices so that the engine may be used to drive the tram or carrier along the cable.

A further object of my invention is to provide a governor for controlling the speed of the carrier and to provide a trip mechanism for automatically shutting off the fuel supply and stopping the engine when the carrier has reached a predetermined location upon said cable.

Other and more specific objects will be apparent from the following description considered in the light of the appended drawings.

My invention consists in the novel construction of a cable supported carrier and in the adaptation and combination therewith of a motor that is carried by the carrier and suitably arranged for driving the same.

I accomplish these objects by devices illustrated in the accompanying drawings, wherein—

Fig. 2 is a view in sectional elevation of the same substantially on broken line 2, 2 of Fig. 1; and Fig. 3 is a plan view of the carrier truck illustrating the wheels that run on the supporting cable and the driving gears connected therewith, the engine and lower portion of the carrier being omitted.

Figure 1:
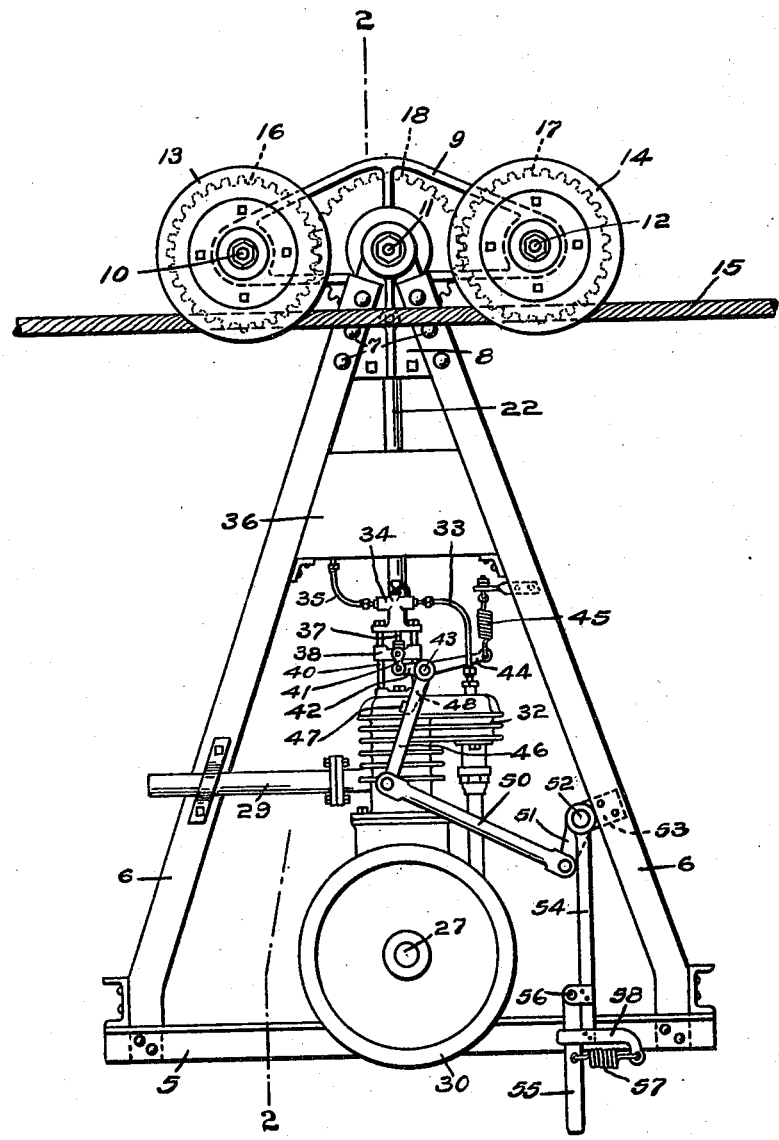
Figure 1 is a view in side elevation of a motor driven cable supported carrier constructed in accordance with my invention.

Referring to the drawings, throughout which like reference numerals indicate like parts, the numeral 5 designates a rectangular base frame and 6 designates upright frame members, only three of which are shown, that are secured at their lower ends to the four corners of the base frame 5 and thence extend upwardly in converging relation and have their top ends fixedly secured by rivets 7 to a casting 8.

The casting 8 is pivoted to another casting 9 that serves as a journal member for three shafts 10, 11 and 12, the shafts 10 and 12 being located near the opposite ends of the casting 9 and the shaft 11 being located midway between the two ends thereof and serving as a pivot for the casting 8 so that the depending portion of the frame is free to swing lengthwise with respect to the casting 9.

The shafts 10 and 12, respectively, are provided on one end with fixedly mounted grooved truck wheels 13 and 14 that are disposed in alinement with each other as shown in Fig. 3, and are adapted to run on a cable 15 and such shafts 10 and 12 are provided on the ends opposite the truck wheels 13 and 14 with fixedly mounted gearwheels 16 and 17.

The shaft 11 is provided on its outer end with a fixedly mounted gearwheel 18 that is adapted to mesh with the gearwheels 16 and 17 and with a fixedly mounted bevel gear 20 that meshes with a bevel pinion 21 on a vertical shaft 22.

The shaft 22 is journaled in suitable bearings 23 and 24 and is provided near its lower end with a bevel gear 25 that is normally adapted to mesh with a bevel pinion 26 on the crank shaft 27 of an internal combustion engine 28.

The crank shaft 27 is provided on the end opposite the pinion 26 with a balance wheel or flywheel 30 of well known form.

The engine 28 is provided with a crank case 31 that rests upon and is rigidly secured to the base frame 5 of the carrier and such engine 28 is provided with an exhaust pipe 29 and with a fuel inlet chamber 32 that is connected by an inlet pipe 33 with a valve 34.

The valve 34 is connected by a pipe 35 with a fuel supply tank 36.

The opening and closing of the valve 34 is controlled by a valve piston 37 that is connected with a yoke 38 mounted on guides 40. The yoke 38 is connected by links 41 with a lever arm 42 that is fixedly secured on a shaft 43 and the shaft 43 is provided with another fixed lever arm 44 the outer end of which is connected with a tension spring 45 that tends to hold the valve 34 in an open position.

Loosely mounted on one end of the shaft 43 is an arm 46 that is adapted to be engaged by the hooked end 47 of a shorter arm 48 that is fixedly secured to the shaft 43. The arm 46 extends in a general downward direction and is connected by a link 50 with an arm 51 on a shaft 52 that is rotatably mounted in fixed brackets 53 on the frame and is provided on its outer end with a downwardly projecting lever 54.

The lower end of the lever 54 is provided with a shock absorbing device comprising an arm 55 pivoted as at 56 and connected with one end of a tension spring 57 that has its other end secured to a cross bar 58 which is fastened to the lower end of the lever arm 54.

The lower end of the arm 55 projects below the bottom of the base frame 5 so that it may strike against a stop (not shown) as the carrier moves along the cable.

The opening of the valve 34 is automatically controlled by a parbolic governor that is provided on the vertical shaft 22 the governor comprising a fixed sleeve 61 and slidable sleeve 62 having a disk 63 formed on the top portion thereof, the slidable sleeve and disk being adapted to be lifted, as the speed of rotation of the shaft 22 is increased, by the toggle action between links 64 and bell crank arms 65 upon the lower ends of which are provided governor balls 66.

The shaft 43 is provided with a fixed arm 67 which in the device herein shown, is a continuation of the arm 44 and is adapted to rest on the top of the disk 63 so that when the disk is raised by an increase in the speed of rotation of the engine the valve 34 will be moved toward a closed position and the supply of the fuel that is admitted to the engine will be reduced and when the disk 63 is lowered by a reduction in the speed of rotation of the engine the outer end of the arm 67 will be free to move downwardly and the force of the spring 45 will tend to open the valve.

The arrangement of the long arm 46 and short arm 48 permit the governor to act to close the valve 34 at any time that it is open and the speed of the shaft 22 exceeds a predetermined maximum.

The tension of the spring 45 is not enough to overcome the friction in the bearings of the shaft 52 and the inertia of the link 50 and the lever 54 so that when the lever 54 is set in one position the spring 45 will not close the valve.

When the lever 54 is moved to the left as shown in Fig. 1, the several links and arms connected therewith will act in an obvious manner to shut off the valve 34 and when such lever arm is moved to the right such links and arms will act in an opposite manner and will permit the spring 45 to open the valve.

The engine and driving mechanism are arranged on the suspended frame so that this frame will normally hang in a vertical position as shown in Figs. 1 and 2.

The engine is preferably reversible so that the carrier may be caused to travel in either direction on the cable 15.

The carrier may be used for transporting loads of any character along the cable 15, as for instance, it may be used for carrying a dump car or bucket from a mine to a distant point where the contents thereof is to be emptied.

If the carriage as shown in Fig. 1, is moving toward the right and an obstruction is placed in the way of the lever arm 55 such lever arm 55 and the lever arm 54 will be moved to the left and the fuel supply valve 34 will be closed when the lever arm 55 strikes the obstruction.

In this way the engine can be stopped when the carriage reaches a certain predetermined location.

Manifestly, changes may be made in the forms, dimensions and arrangement of parts of my invention without departing from the spirit thereof.

What I claim is:

1. An apparatus of the class described, comprising a track cable, a truck movable thereon, a frame suspended from said truck, a motor on said frame, driving means connecting said motor with said truck, a governor associated with said driving means, and a trip lever for controlling said motor.

2. A carrier of the class described, comprising a truck portion having alined grooved wheels that are adapted to run on a track cable, a frame pivotally secured to said truck portion and adapted to swing lengthwise thereof, power generating devices carried on said frame and power transmission devices connecting said power generating devices with said truck wheels whereby the wheels may be driven.

3. A carrier of the class described, comprising a truck frame, shafts extending crosswise thereof adjacent each end, grooved wheels secured on one end of each of said shafts, gearwheels secured on the opposite ends of said shafts, another shaft extending crosswise in the center of said frame, a gearwheel on said centrally located shaft and meshing with said two first named gearwheels, a bevel gear secured to said last named gearwheel, a depending frame pivotally supported on said centrally located shaft, a vertical driven shaft journaled on said depending frame, a bevel pinion on the upper end of said driven shaft and adapted to mesh with said bevel gear and an engine supported on said depending frame and connected with said vertical shaft for driving the same.

4. A carrier of the class described, comprising a truck frame, shafts extending crosswise thereof adjacent each end, grooved wheels secured on one end of each of said shafts, gearwheels secured on the opposite ends of said shafts, another shaft extending crosswise in the center of said frame, a gearwheel on said centrally located shaft and meshing with said two first named gearwheels, a bevel gear secured to said last named gearwheel, a depending frame pivotally supported on said centrally located shaft, a vertical driven shaft journaled on said depending frame, a bevel pinion on the upper end of said driven shaft and adapted to mesh with said bevel gear, an engine carried by said depending frame and provided with a horizontal driving shaft, bevel gears connecting said vertical driven shaft with said driven shaft, a governor on said vertical shaft, a fuel inlet valve for said engine, means connected with said governor for automatically regulating said fuel inlet valve, and mechanism connected with said valve and adapted to be actuated by tripping devices in the path of said carrier to close said valve.

In witness whereof I hereunto subscribe my name this 5th day of March, A. D. 1918.

GOTTWERTH L. TANZER.

Copies of this patent may be obtained for five cents each, by addressing the "Commissioner of Patents, Washington, D. C."